(12) United States Patent
Bearzot

(10) Patent No.: US 8,465,086 B2
(45) Date of Patent: Jun. 18, 2013

(54) INFLATABLE PANELS BODYWORK FOR AUTOMOTIVE VEHICLES

(76) Inventor: Edgardo Enrique Bearzot, Ciudad Autonoma de Buenos Aires (AR)

(*) Notice: Subject to any disclaimer, the term of this patent is extended or adjusted under 35 U.S.C. 154(b) by 0 days.

(21) Appl. No.: 13/086,649

(22) Filed: Apr. 14, 2011

(65) Prior Publication Data

US 2012/0261948 A1 Oct. 18, 2012

(51) Int. Cl.
B62D 29/04 (2006.01)

(52) U.S. Cl.
USPC .................. 296/187.02; 296/187.06; 293/107

(58) Field of Classification Search
USPC ............ 296/187.06, 187.03, 187.01, 193.05, 296/193.09, 203.01, 203.03, 203.02, 187.02; 293/107
See application file for complete search history.

(56) References Cited

U.S. PATENT DOCUMENTS

| | | | | |
|---|---|---|---|---|
| 3,764,174 A * | 10/1973 | Taninecz | ........................ | 293/107 |
| 4,995,659 A * | 2/1991 | Park | ............................... | 293/107 |
| 5,115,878 A * | 5/1992 | Hayata | ........................ | 180/69.21 |
| 6,048,022 A * | 4/2000 | Ishibashi et al. | ......... | 296/187.09 |
| 6,341,813 B1 * | 1/2002 | Taghaddos | ............... | 296/187.06 |
| 6,386,623 B1 * | 5/2002 | Ryan et al. | ............... | 296/187.04 |
| 6,746,074 B1 * | 6/2004 | Kempf et al. | ............ | 296/187.04 |
| 7,150,496 B2 * | 12/2006 | Fujimoto | ................. | 296/187.04 |
| 7,325,642 B2 * | 2/2008 | Roux et al. | ..................... | 180/274 |
| 7,392,876 B2 * | 7/2008 | Browne et al. | ................ | 180/274 |
| 8,007,036 B2 * | 8/2011 | Fukumoto et al. | ........ | 296/193.11 |
| 8,042,449 B2 * | 10/2011 | Farinella et al. | ............ | 89/36.01 |
| 8,061,258 B2 * | 11/2011 | Hoadley et al. | ............... | 89/36.17 |
| 2008/0088154 A1 * | 4/2008 | Rocheblave et al. | .... | 296/187.04 |
| 2011/0309654 A1 * | 12/2011 | Di Camillo | ............. | 296/187.03 |

* cited by examiner

Primary Examiner — Glenn Dayoan
Assistant Examiner — Pinel Romain
(74) Attorney, Agent, or Firm — Defillo & Associates, Inc.; Evelyn A. Defillo

(57) ABSTRACT

A bodywork for vehicles including panels made of a deformable material and filled with a pressured fluid. The panels are located on the external sections of the bodywork.

4 Claims, 2 Drawing Sheets

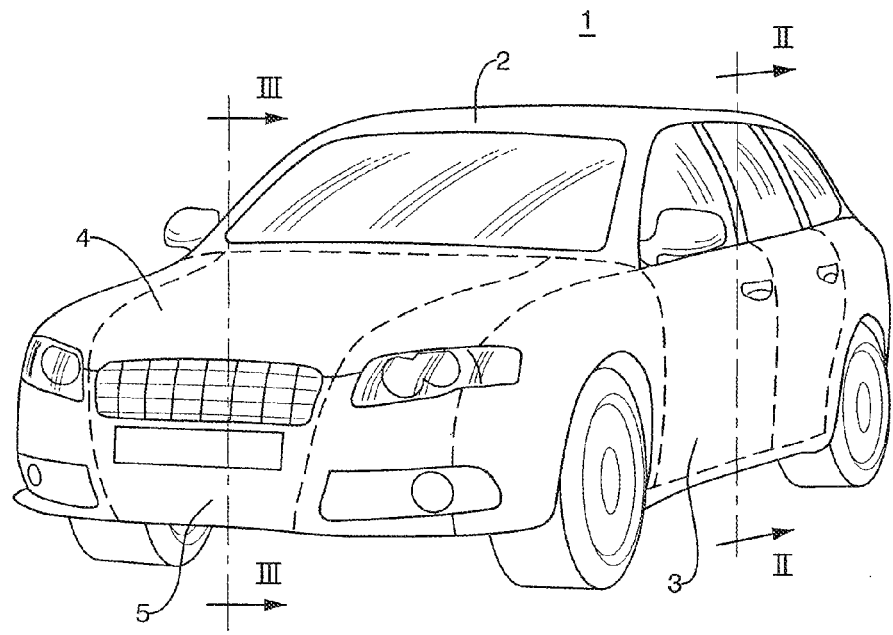
Fig. 1
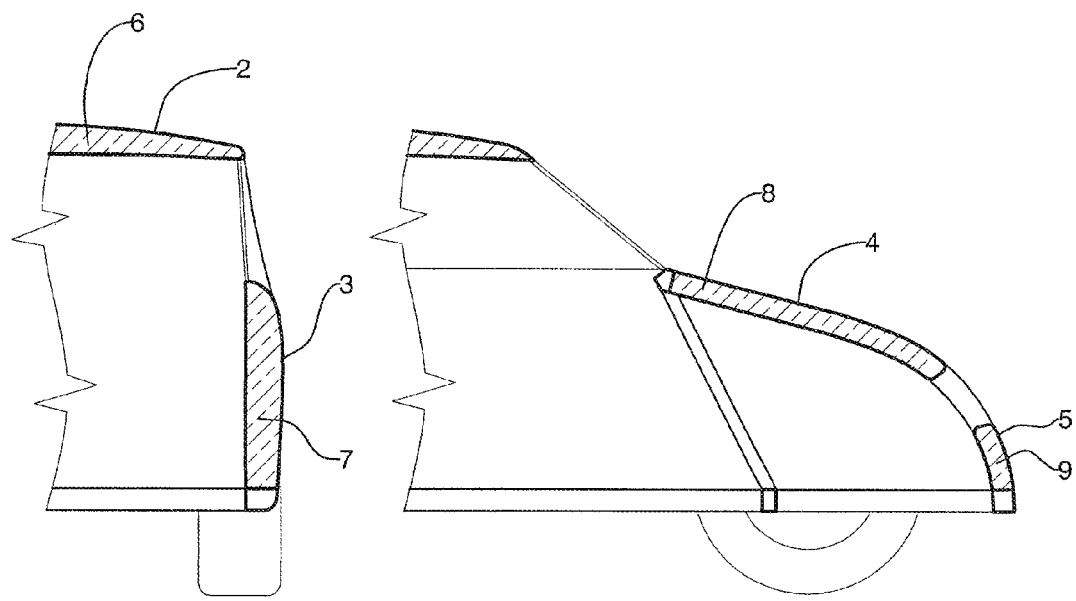
Fig. 2                    Fig. 3

INFLATABLE PANELS BODYWORK FOR AUTOMOTIVE VEHICLES

FIELD OF THE INVENTION

The invention is related to bodywork having inflatable panels for an automobile, and more precisely a bodywork which includes several inflatable hollow panels of a deformable material, strategically located along the bodywork.

BACKGROUND OF THE INVENTION

The use of inflatable bags such as the widely known "air bags", which are located in the interior of the vehicle, is well known for the protection of passengers of car vehicles.

A higher level of safety may be conferred to the passengers of the vehicle through the present invention since the energy consumed in the event of a crash is better used, the mass is diminished and the distortion shape of the vehicle's bodywork is improved.

In the event of a crash or accident, and with the application of the present invention, an elastic and not a plastic crash is produced due to the deformation caused to the inflatable panels.

SUMMARY OF THE INVENTION

The main object of the present invention is to provide a bodywork for a vehicle including a plurality of panels strategically located, which novelty includes that the panels are hollow, tight sealed, made of a deformable material, and filled with a pressure fluid.

In an embodiment of the present invention, the inflatable panels are located in the external parts of the bodywork in the zones subject to impact in the event of vehicle crashes.

In some embodiments, the panels are filled with a pressurized gas. In some embodiments, the panels are filled with pressurized liquid.

BRIEF DESCRIPTION OF THE DRAWINGS

These and other aspects and advantages of the present invention will be evidenced and clarified with reference to the execution described hereinafter.

In the description, the figures show:

FIG. 1 shows a perspective front view of a vehicle including the inflatable panels according to an exemplary embodiment of the present invention;

FIG. 2 shows a cross sectional view taken along line II-II of FIG. 1; and

FIG. 3 shows a cross sectional view taken along line III-III of FIG. 1.

DETAILED DESCRIPTION OF THE INVENTION

Figure 4:
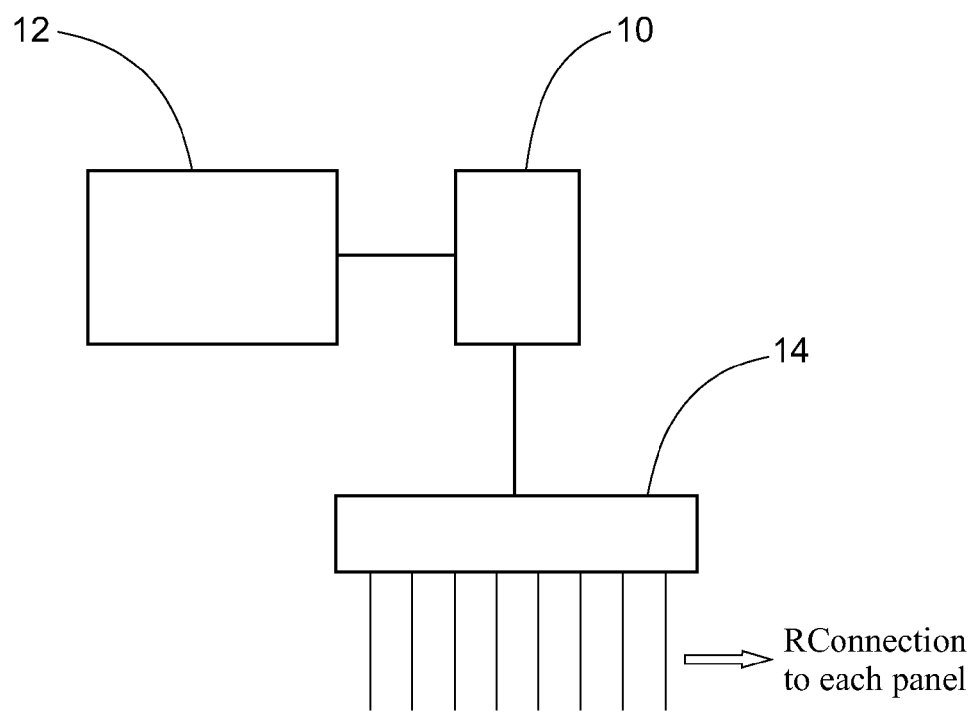
FIG. 4 shows a connection between the panels and a compressor that is activated by a car engine.

In FIG. 1, shows a bodywork 1 for a vehicle including a roof panel 2, a hood panel 4, a front panel 5, and side door panels 3. These panels receive the impact in the event of a crash or turnover of the vehicle since they are located in the external part of the bodywork.

In FIG. 2, shows that the roof panel 2 includes a hollow cavity 6. The cavity 6 is fill with a pressurized fluid. The side door panels 3 also include a hollow cavity 7 filled with a pressurized fluid.

In FIG. 3, shows that the hood 4 includes a hollow cavity 8, which is fill with a pressurized fluid. The front panel 5 also include a hollow cavity 9 filled with a pressurized fluid.

In some embodiments, all of the panels may be fill out with the same pressurized fluid. In some embodiments, at least one panel is filling out with a different pressurized fluid. The panels are constantly at least partially fill with the pressurized fluid.

The panels 2, 3, 4, and 5 may be made of a deformable material. The panels 2, 3, 4, and 5 may be made inflatable panels.

The panels may be fill with the pressurized fluid by a compressor 10 operated by the car's engine 12. (FIG. 4)

In this variant, the gas pressure can be regulated through a control system 14 which varies the pressure according to the parameters previously set forth.

Another variant of the invention consists in the fact that, in the event certain parts of the bodywork should need a higher weight, the corresponding panels may be filled totally or partially with a liquid.

What is claimed is:

1. A bodywork for a vehicle comprising:
   a vehicle frame;
   a plurality of panels located around the vehicle frame, the plurality of panels include a roof shaped panel, at least one side door shaped panel, a hood shaped panel, and a bumper shaped panel;
   a hollow panel connected to each one of the roof shaped panel, each side door shaped panel, the hood shaped panel, and the bumper shaped panel;
   each hollow panel is made of a deformable material;
   each hollow panel is filled with a pressurized liquid.

2. The bodywork according to claim 1, wherein at least one of the hollow panels is filled with a different pressurized liquid.

3. A bodywork for a vehicle consisting of:
   a vehicle frame;
   a plurality of panels located around the vehicle frame, the plurality of panels include a roof shaped panel, at least one side door shaped panel, a hood shaped panel, and a bumper shaped panel;
   a hollow panel connected to an inside section of each one of the roof shaped panel, each side door shaped panel, the hood shaped panel, and the bumper shaped panel;
   each hollow panel is made of a deformable material;
   each hollow panel is filled with a pressurized liquid.

4. A bodywork for a vehicle comprising:
   a vehicle frame;
   a plurality of panels located around the vehicle frame, the plurality of panels include a roof shaped panel, at least one side door shaped panel, a hood shaped panel, and a bumper shaped panel;
   a hollow panel connected to each one of the roof shaped panel, each side door shaped panel, the hood shaped panel, and the bumper shaped panel;
   a compressor operates by the car engine;
   each hollow panel is made of a deformable material;
   each hollow panel is filled with a pressurized liquid;
   pressure on the hollow panels is regulated by the compressor;
   the pressure of the pressurized liquid is regulated by a control system, the control system varies the pressure according to predetermined parameters.

* * * * *